Dec. 23, 1969   M. O. CHRISTMAN   3,485,204
INDICATING SLIDE MECHANISM
Filed Sept. 23, 1968
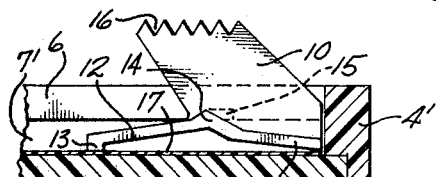
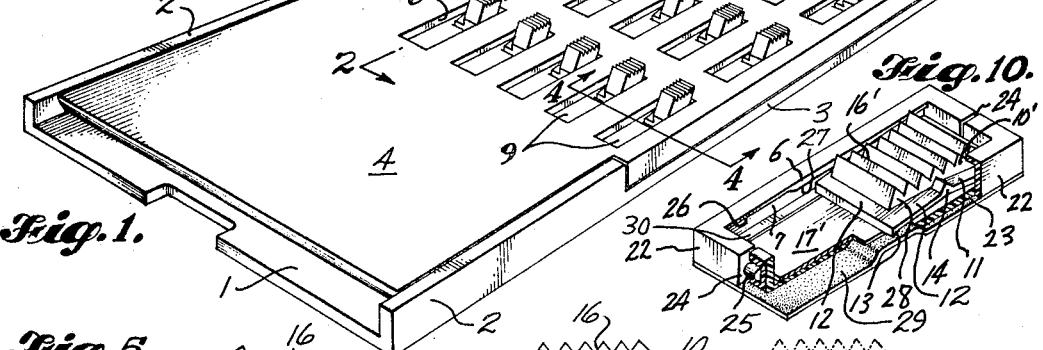
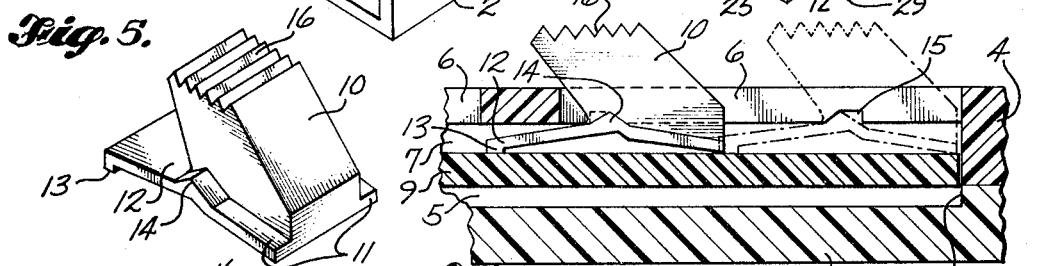
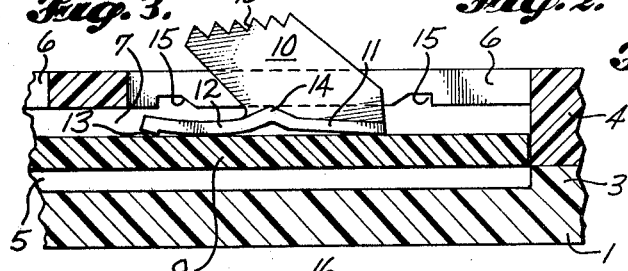
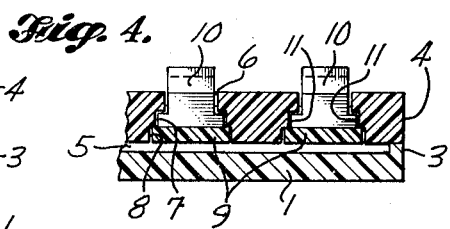
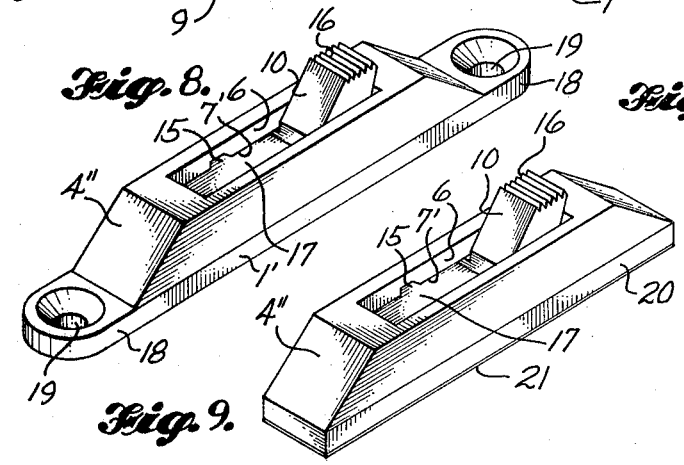
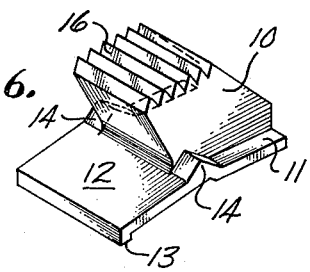
INVENTOR
MARVIN O. CHRISTMAN
BY
Robert W Beach
ATTORNEY 3,485,204
Patented Dec. 23, 1969

3,485,204
INDICATING SLIDE MECHANISM
Marvin O. Christman, 4350 53rd NE.,
Seattle, Wash. 98105
Filed Sept. 23, 1968, Ser. No. 761,758
Int. Cl. G09f 9/00, 5/00; H01h 15/00
U.S. Cl. 116—135        8 Claims

ABSTRACT OF THE DISCLOSURE

The body of an indicating slide is slidably received in a slot of a mounting, which slot is of greater length than the body length so that the slide can be moved along the slot. Flanges projecting laterally from the bottom of the slide body are engaged in guide grooves alongside the slot and have projections engageable in recesses to deter sliding of the slide. The slide body is supported by a flexible leaf which can be flexed by pressing the slide body downward to displace the locating projections from their cooperating recesses.

---

The indicating slide mechanism of the present invention can be used in a card-holding indicating device of the type shown in United States Patent No. 3,402,694 or in the warning signal for a chart holder shown in U.S. Patent No. 2,731,941 or in the aircraft panel shown in U.S. Patent No. 3,343,290. In this connection, it is a principal object of the present invention to provide an indicating slide which is light, compact, inexpensive to manufacture, and simple in construction.

It is a further object to provide such an indicating slide which can be installed easily in a slotted mounting.

Another object is to provide such an indicating slide which can be moved easily from one position to another such positions, yet can be released from either of such positions easily and quickly.

Another object is to provide mountings of various types for such indicating slide mechanism which will adapt it to be used in a variety of applications.

FIGURE 1 is a top perspective of a panel type mounting for a number of indicating slides.

FIGURES 2 and 3 are vertical sections taken on line 2—2 of the panel mounting shown in FIGURE 1 with an indicating slide shown in different positions in the two figures. FIGURE 4 is a vertical section through the panel mounting of FIGURE 1 taken on line 4—4 of that figure.

FIGURE 5 is a top perspective of a slide member as seen from one end and FIGURE 6 is a top perspective of such slide member viewed from the opposite end.

FIGURE 7 is a vertical section through a different type of indicating slide mounting.

FIGURE 8 is a top perspective of one type of individual slide mounting and FIGURE 9 is a top perspective of another type of individual slide mounting.

FIGURE 10 is a top perspective of still a different individual slide mounting having parts broken away.

The panel type of slide mounting shown in FIGURES 1, 2, 3 and 4 is somewhat similar to the slide mounting shown in the card-holding indicating device of my U.S. Patent No. 3,402,694 mentioned above. Such panel mounting includes a base bottom plate 1 having spaced parallel base flanges 2 projecting upward from its opposite edges over a portion of the length of the base and relatively low flanges 3 projecting upward from the opposite edges of the base bottom plate over the remainder of its length. A top plate 4 fits over the bottom plate 1 with edge portions of such top plate resting on the low flanges 3 and having recesses for receiving the high flanges 2 to prevent shifting of the top plate relative to the base.

The height of the low flanges 3 supporting the top plate 4 will hold top plate spaced above the upper side of the base bottom plate 1 to provide a card-receiving recess 5 between the top plate and the bottom plate, as shown best in FIGURES 2 and 3. Such recess may open at the end of the panel mounting in the left foreground of FIGURE 1 so that a card of a size substantially as large as the bottom plate 1 and of the same shape can be slid into such recess between the top and bottom plate.

In the top plate 4 any number of slots 6 can be provided, depending upon the number of indicating slides which it is desired to incorporate in the indicating device and the size of such slides. Preferably, as shown in FIGURE 1, the slots are disposed with their lengths extending lengthwise of the rectangular panel mounting and with the slots arranged in rows and columns with appropriate spacing between adjacent columns and adjacent rows. The walls of each slot 6 have two stepped undercuts 7 and 8, as shown best in FIGURE 4. The undercut 7 forms grooves at opposite sides of the slot, the lower portions of which are closed by retainer strips 9, wider than the distance between the undercuts 7, but of a width to be received between the undercuts 8. Preferably, the strips 9 are of a width to fit snugly between the undercut wall portions 8 at opposite sides of each groove 6 and of a thickness substantially equal to the depth of such undercuts so that the lower surface of each strip is disposed flush with the portions of the lower surface of the top plate 4 adjacent to such a strip.

The strips 9 serve as retainers to hold in place the indicating slides, the bodies 10 of which project upward through the grooves 6. Base flanges 11 projecting laterally from the slide bodies are received in the grooves formed by the undercuts 7 and the retainer strips 9. The slide base is offset toward one end of the slide base, as shown in FIGURE 3, so that the portion of the slide base lengthwise beyond the root of the body forms a flexible cantilever leaf 12 having a foot or bearing rib 13 spaced from the body. The undersurface of the base slopes from its opposite ends upward toward the center, forming a dihedral angle, so that a cavity will be left between the central portion of the undersurface and the surface below it as shown in FIGURE 2.

The leaf 12 of the base is of resilient material, preferably of plastic material and preferably integral with the slide body 10. In any event, the leaf 12 is sufficiently flexible so that, by exerting downward pressure on the slide body 10, such body can be depressed from the position of FIGURE 2 to that of FIGURE 3, in which the leaf 12 is shown as being bent. Such leaf should have sufficient resiliency so that when the downward pressure on the slide body 10 is relieved, leaf 12 will exert sufficient force to raise the slide body again from the position of FIGURE 3 to that of FIGURE 2.

Projections 14 project upward from the base flanges 11 and leaf 12 substantially midway between the opposite ends of the slide base because that is the portion of the base which is depressed to the greatest extent when downward pressure is exerted on the slide body 10. When the slide is pressed downward, the tops of the projections 14 should be below the upper side of the undercuts 7, as shown in FIGURE 3, so that the slide can be moved freely along the length of its slot 6. If, under such conditions, the tops of the projections 14 are only slightly below the upper walls of the undercuts 7, the leaf 12 would not be able to raise the slide body 10 from the position shown in FIGURE 3 to that of FIGURE 2. In order to enable the slide body to be thus raised, it is necessary to provide, in the upper walls of the recesses 7, locating notches 15, shown in FIGURES 2 and 3, which are of a size to accommodate the projections 14.

In FIGURES 2 and 3 two locating notches 15 are shown in one side of the slide-receiving slot 6 which correspond to two different positions in which the slide can be located. In each of these positions, one being shown in full lines and the other being shown in broken lines in FIGURE 2, the projections 14 are raised by the force of the resilient leaf 12 into notches 15. The slide then cannot be moved, or at least moved readily, along the slot until the slide body has been depressed again. To facilitate such depression of the slide body, its upper surface may be formed as a ridged gripping surface 16. Also, while FIGURES 2 and 3 show only two slide-locating notches 15, it will be evident that a larger number of such notches can be provided at opposite sides of each slot 6 if desired.

A card inserted into the recess 5 of the panel type mounting shown in FIGURES 1, 2 and 3 can bear indicia at locations corresponding to the several slots 6. Also, the indicia visible through one portion of such a slot may be different from the indicia visible through another portion of such slot. To enable such indicia to be visible through the slot, it is necessary for the retainer strips 9 to be transparent. Also, in order for a slide to obscure a portion of the indicia on such a card, it is necessary for at least a portion of the slide to be opaque and, preferably, the entire slide is opaque. Thus, when a slide is in the full-line position of FIGURE 2, indicia, on a card inserted into the recess 5, located at the right of such slide will be visible through the portion of slot 6 and the portion of the strip 9 at the right of slide 10. Conversely, when the slide is in the broken-line position shown in FIGURE 2, indicia on the card to the left of the slide will be visible through the left end of slot 6 and the portion of the strip 9 to the left of the broken-line position of such slide.

In FIGURE 7 the structure of the slide mounting does not provide a card-receiving recess. On the contrary, the mounting includes a base 1' which is recessed into the lower edge of a rim on the top 4'. The upper portion of such top has in it a slot 6 through which the body 10 of a slide projects. At least one side of the top 4' also has in it a groove 7' for receiving a base flange 11 projecting laterally from one side of the slide. Also, the upper portion of groove 7' has in it a notch 15 into which a locating projection 14 of the slide can engage, as described in connection with the slide installation of FIGURES 2 and 3. The slide shown in FIGURE 7 has the same structure as that of the slide illustrated in FIGURES 1 through 6 inclusive.

Instead of having a card-receiving recess, the slide mounting of FIGURE 7 has an indicator strip 17 applied to the upper surface of the base bottom plate 1'. If the slide again is opaque, it will hide all indicia on the indicator strip disposed beneath the slide while any indicia on such indicator strip to the left of the slide will be visible through the slot 6. Any such indicia will, however, be obscured if pressure is applied to the top of the slide so as to depress the slide body 10 for moving the projection 14 down out of engagement with the locating notch 15 and the slide is then shifted to the left over such indicia.

In FIGURES 8 and 9 two different types of individual slide mountings are shown. The structure of the slide mountings in each instance may be similar to that of the slide mounting shown in FIGURE 7 with respect to the disposition of the slide body 10 in the slot 6 and the provision of locating notches 15 in which projections 14 of the slide base can engage. Instead of the slide mounting having vertical flanges, such as flange 4' shown in FIGURE 7, however, the ends of the mounting body 4'' in each instance are inclined. The base 1' of the mounting shown in FIGURE 8 has ears 18 projecting beyond the inclined surfaces 4'', having apertures 19 in them through which anchoring bolts, screws, rivets or nails can extend. Alternatively, the mounting may have a base 20, the bottom of which has on it a layer 21 of pressure-sensitive adhesive. Such a mounting, therefore, can simply be applied by pressure to any suitable panel or other backing.

In the mountings of FIGURES 7, 8 and 9 it is necessary for the base to be formed separately from the top so that the slide can be inserted through the open bottom of the top and the slide body 10 moved upward through the slot 6. The base can then be secured in any suitable fashion to the top, such as by adhesive bonding if the mounting is made of plastic material or adhesive bonding or soldering if the parts are made of metal. In the construction of FIGURE 10 the mounting is made of complemental parts which can be assembled, each part including a flange 22 of U-shape upstanding from a base plate 23. Such two parts of the mounting may be duplicates.

The component parts of the mounting shown in FIGURE 10 may be assembled with a slide between them to form a longitudinal joint 24. One of the ends of the flanges 22 at a joint 24 may carry a projecting pin 25 engageable in a socket in the other flange end. The edges of the adjacent base plates 23 simply abut. The opposite side flanges have grooves 7 beneath the edges of slot 6 in which the lateral flanges 11 of the slide engage. Such grooves 7 may have wide end portions 26 and narrow center portions 27 so that the wide end portions 26 correspond to the notches 15 previously described in which projections 14 of the slide base can engage. In this instance, the slide body 10' is much flatter and longer than in the type of slide previously described and a cantilever end portion 28 of the slide body overlies the flexible and resilient leaf 12 of the slide base quite closely.

The complemental parts of the mounting can be secured together by bonding the pins 25 in their sockets or by securing a strip 29 across the bases of the two components or both. The inner side of the base can be covered by a strip 17' bearing indicia. Preferably, such strip is depressed below rails 30 on opposite sides of the mounting on which the foot 13 and the underside of the flanges 11 at the opposite end of the slide base. Because the slide rides on such rails, its movement will not disturb the strip 17'.

The central portion of the mounting bottom 23 may have in it a transverse slot through which a portion of the adhesive strip 29 may be deflected upward for attachment to the underside of strip 17'. In addition, or alternatively, the ends of such strip may be inserted in recesses in the end flanges of the complemental components to retain the strip 17' in place beneath the slide.

I claim:

1. Indicating slide mechanism comprising a mounting having an elongated slot therein, a slide including a slide body projecting outward through said slot and movable lengthwise thereof, slide-locating means including interengageable members deterring movement of said slide body along said slot when said members are interengaged and disengageable by depression of said slide for movement of said slide, one of said members being carried by said mounting and the other of said members being carried by said slide, and said slide including yieldable means bendable along a zone extending transversely of the length of said slot to enable said slide body to be depressed to disengage said interengageable members for movement of said slide body along said slot.

2. The indicating slide mechanism defined in claim 1, and an indicia strip at the side of the slide remote from the mounting slot.

3. The indicating slide mechanism defined in claim 1, in which the slot in the mounting is stepped in cross section to provide an inner portion of a width greater than that of an outer portion, and retainer strip means at the side of the slide remote from the mounting slot for retaining the slide in a position with the slide body projecting outward through the mounting slot.

4. The indicating slide mechanism defined in claim 1, in which the mounting has a pressure-sensitive adhesive surface at the side opposite its slot for attaching the mounting to a backing.

5. The indicating slide mechanism defined in claim 1, in which the mounting includes two spaced rail means disposed inwardly of the mounting slot and having their lengths extending generally parallel to the length of the slot along which rail means the slide can slide.

6. The indicating slide mechanism defined in claim 5, and an indicia strip carried by the mounting, located between the two rail means and visible through the mounting slot.

7. The indicating slide mechanism defined in claim 1, in which the yieldable means includes a resilient leaf carried by the slide and engageable with the mounting to urge the slide outward through the slot, said leaf being of cantilever construction and projecting from the slide lengthwise of the mounting slot.

8. The indicating slide mechanism defined in claim 7, in which the slide includes a rigid section having one edge engaging the mounting and its opposite edge being connected to the resilient leaf, and the undersurface of said rigid section and of the leaf form a dihedral angle providing a cavity between the base of the slide and the mounting, the volume of which cavity is reduced by depression of the slide body relative to the mounting slot.

References Cited

UNITED STATES PATENTS

| | | | |
|---|---|---|---|
| 1,772,703 | 8/1930 | Burleigh | 116—135 |
| 2,785,240 | 3/1957 | Carling | 200—16 |
| 3,173,306 | 3/1965 | Hoag | 200—166 |
| 3,174,002 | 3/1965 | Golbeck | 200—166 |
| 3,221,115 | 11/1965 | Feher | 200—77 |
| 3,271,535 | 9/1966 | Vahanzi | 200—166 |
| 3,292,284 | 12/1966 | Manzo | 40—62 |
| 3,348,014 | 10/1967 | Brown | 200—172 |

LOUIS J. CAPOZI, Primary Examiner

U.S. Cl. X.R.

40—65; 200—16